(12) United States Patent
Zhou et al.

(10) Patent No.: US 11,068,449 B2
(45) Date of Patent: Jul. 20, 2021

(54) DATA MIGRATION METHOD, APPARATUS, AND STORAGE MEDIUM

(71) Applicant: TENCENT TECHNOLOGY (SHENZHEN) COMPANY LIMITED, Shenzhen (CN)

(72) Inventors: Jin Zhou, Shenzhen (CN); Xili Ye, Shenzhen (CN); Bin Hu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 201 days.

(21) Appl. No.: 16/412,584

(22) Filed: May 15, 2019

(65) Prior Publication Data

US 2019/0266134 A1   Aug. 29, 2019

Related U.S. Application Data

(63) Continuation of application No. PCT/CN2017/118398, filed on Dec. 25, 2017.

(30) Foreign Application Priority Data

Jan. 11, 2017   (CN) .......................... 201710021450.2

(51) Int. Cl.
  *G06F 16/21*   (2019.01)
  *G06F 16/22*   (2019.01)
  (Continued)

(52) U.S. Cl.
  CPC ........ *G06F 16/214* (2019.01); *G06F 16/2282* (2019.01); *G06F 16/2358* (2019.01);
  (Continued)

(58) Field of Classification Search
  CPC .... G06F 16/214; G06F 16/27; G06F 16/2282; G06F 16/2358; G06F 16/254; G06F 21/31
  (Continued)

(56) References Cited

U.S. PATENT DOCUMENTS 9,619,492 B2   4/2017   Gao et al.
2016/0099998 A1*   4/2016   Richman ................. H04L 67/06
                                                                    709/202

FOREIGN PATENT DOCUMENTS

CN   102999537 A   3/2013
CN   104021123 A   9/2014
(Continued)

OTHER PUBLICATIONS

International Search Report dated Mar. 12, 2018 in PCT/CN2017/118398, with English translation.
Written Opinion dated Mar. 12, 2018 in PCT/CN2017/118398.

*Primary Examiner* — Evan Aspinwall
(74) *Attorney, Agent, or Firm* — Oblon, McClelland, Maier & Neustadt, L.L.P.

(57) ABSTRACT

An apparatus including processing circuitry and a data migration method are provided. The processing circuitry obtains configuration information including a source address of a source database and a target address of a target database. The processing circuitry establishes a migration channel between the source database and the target database based on the configuration information and sending a data migration request to the source database through the migration channel. The data migration request includes information of one or more data tables including data to be migrated from the source database to the target database and having a data table structure. The processing circuitry send, through the migration channel, the data in the one or more data tables (Continued)

and incremental data generated while the data is sent from the source database to the target database.

18 Claims, 7 Drawing Sheets

(51) Int. Cl.
*G06F 16/23* (2019.01)
*G06F 21/31* (2013.01)
*G06F 16/27* (2019.01)
*G06F 16/25* (2019.01)

(52) U.S. Cl.
CPC ............ *G06F 16/254* (2019.01); *G06F 16/27* (2019.01); *G06F 21/31* (2013.01)

(58) Field of Classification Search
USPC ......................................................... 707/609
See application file for complete search history.

(56) References Cited

FOREIGN PATENT DOCUMENTS

| | | | |
|---|---|---|---|
| CN | 104731888 A | | 6/2015 |
| CN | 105472045 A | * | 4/2016 |
| CN | 105472045 A | | 4/2016 |
| CN | 105718570 A | | 6/2016 |
| CN | 106874389 A | | 6/2017 |

\* cited by examiner

DATA MIGRATION METHOD, APPARATUS, AND STORAGE MEDIUM

CROSS-REFERENCE TO RELATED APPLICATIONS

This application is a continuation application of International Application No. PCT/CN2017/118398, filed on Dec. 25, 2017, which claims priority to Chinese Patent Application No. 201710021450.2, filed on Jan. 11, 2017. The entire disclosures of the prior applications are hereby incorporated by reference in their entireties.

FIELD OF THE TECHNOLOGY

The disclosure relates to the field of Internet technologies.

BACKGROUND OF THE DISCLOSURE

A database is a warehouse that organizes, stores, and manages data according to a data structure. With the development of Internet technologies, in a scenario such as upgrading server hardware of a database, data of the database usually needs to be migrated from one electronic device to another electronic device.

SUMMARY

According to various embodiments provided in the disclosure, a data migration method, an information processing apparatus, and a storage medium are provided.

To achieve the foregoing objectives, the following technical solutions are used in the embodiments of the disclosure.

An information processing apparatus including processing circuitry and a data migration method are provided. The processing circuitry obtains configuration information of a source database and a target database where the configuration information includes a source address of the source database and a target address of the target database. The processing circuitry establishes a migration channel between the source database and the target database based on the configuration information. The processing circuitry sends a data migration request to the source database through the migration channel where the data migration request includes information of one or more data tables including data to be migrated from the source database to the target database. The one or more data tables have a data table structure. The processing circuitry sends, through the migration channel, the data in the one or more data tables from the source database to the target database. The processing circuitry further sends, from the source database to the target database, incremental data generated while the data in the one or more data tables is sent from the source database to the target database.

In an embodiment, the processing circuitry connects to the source database according to the source address and connects to the target database according to the target address.

In an embodiment, the processing circuitry extracts, through the migration channel, the incremental data of the source database and imports the incremental data to the target database through the migration channel in a chronological order that the incremental data is generated.

In an embodiment, the processing circuitry configures an agent process for the source database where the agent process is configured to parse a data log of the source database to obtain incremental information of the source database. The incremental information indicates changes to the data while the data is sent from the source database to the target database. The processing circuitry extracts the incremental data that corresponds to the incremental information in the chronological order.

In an embodiment, the processing circuitry sends a flip-flop generation instruction to the source database that is configured to generate a flip-flop according to the flip flop generation instruction. The flip-flop indicates changes to the data in an incremental table where the changes are made while the data is sent from the source database to the target database. The processing circuitry extracts the incremental data from the incremental table.

In an embodiment, the configuration information further includes a source database user name, a source database password, a target database user name, and a target database password. The processing circuitry sends a source connection request to the source database where the source connection request includes the source address, the source database user name, and the source database password. The processing circuitry connects to the source database after being authenticated by the source database. The processing circuitry further sends a target connection request to the target database and connects to the target database after being authenticated by the target database. The target connection request includes the target address, the target database user name, and the target database password.

In an embodiment, the configuration information further includes a login name and a login password for the source database. The processing circuitry sends a permission verification request to the source database according to the login name and the login password and configures the agent process for the source database after being authenticated by the source database.

In an embodiment, the processing circuitry sends, through the migration channel, a synchronization instruction to the source database, receives, from the source database, the data table structure in response to the synchronization instruction, and sends the data table structure to the target database to configure the target database to establish a data table using the same data table structure.

In an example, a source database structure of the source database is different from a target database structure of the target database.

In an embodiment, the configuration information further includes an additional target address of an additional target database. The processing circuitry sends the data in the one or more data tables from the source database to the additional target database and sends, from the source database to the additional target database, the incremental data.

Aspects of the disclosure also provide a non-transitory computer-readable storage medium storing computer-readable instructions which when executed by one or more processors cause the one or more processors to perform the data migration method.

The details of one or more embodiments of the disclosure are disclosed in the following accompanying drawings and description. Other features, objectives, and advantages of the disclosure become clearer from the specification, the accompanying drawings, and the claims.

BRIEF DESCRIPTION OF THE DRAWINGS

To describe the technical solutions in the embodiments of the disclosure more clearly, the following briefly describes the accompanying drawings used for describing the embodiments. The accompanying drawings in the following description show merely some embodiments of the disclosure, and a person of ordinary skill in the art may still derive other embodiments from these accompanying drawings.

DESCRIPTION OF EMBODIMENTS

To make the objectives, technical solutions, and advantages of the disclosure clearer and more comprehensible, the following further describes the disclosure in detail with reference to the accompanying drawings and embodiments. It should be understood that the specific embodiments described herein are merely used for explaining the disclosure but are not intended to limit the disclosure.

In the migration process of the data of the database, an update of a service of an original database needs to be stopped, and the data of the database needs to be copied to a new environment and then the service is restarted. In an example, the service of the original database needs to be interrupted. Consequently, the service of the database is affected to some extent, and the operation convenience is low.

Figure 1:
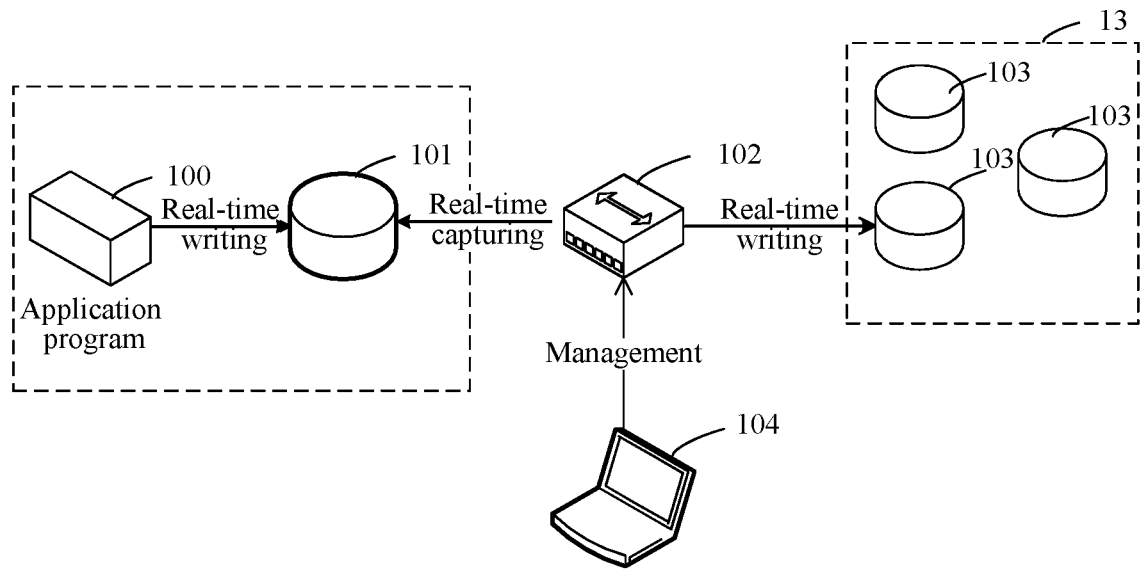
FIG. 1 is a schematic diagram of an application environment of a solution according to an embodiment of the disclosure.

FIG. 1 is a schematic diagram of an application environment of a data migration method according to an embodiment. As shown in FIG. 1, the application environment includes a source database 101, a transit server 102 (or an information processing apparatus 102), a target database 103, and an application terminal 104. A client terminal is configured on the application terminal for inputting configuration information for the transit server 102. In an embodiment, the configuration information is associated with a source database and a target database. The application terminal 104 is communicatively connected with the transit server 102. A user performs an operation on the application terminal, to perform configuration for data migration from the source database 101 to the target database 103. The configuration information is sent to the transit server 102 by using a network, and the configuration information includes a source database address and a target database address. The transit server 102 connects to the source database 101 and the target database 103 according to the configuration information, to establish a data migration channel to the source database 101 and the target database 103. The source database 101 may be a database that provides support to an application program 100. All data that is written into by using the application program 100 is stored in the source database 101. Data of the source database 101 is migrated to the corresponding target database 103 through the data migration channel. In another implementation, the target database 103 may be a server in a network cloud server cluster 13, and the client terminal is an operation platform of the network cloud server. The user logs in to the operation platform of the network cloud server to configure information, and migrates the data of the source database 101 to the network cloud server 103 by using the transit server 102. After the migration is completed, service data of the application program 100 is stored in the network cloud server 103.

Figure 2:
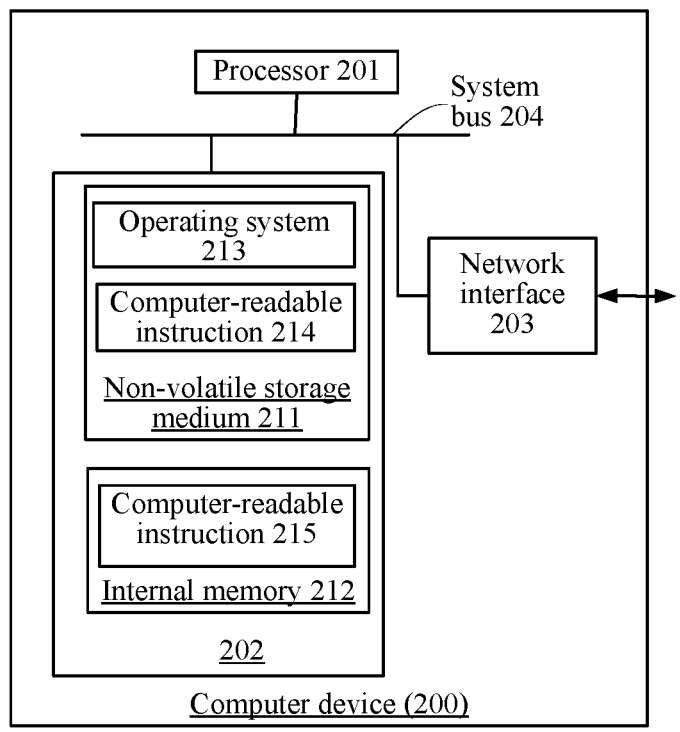
FIG. 2 is a schematic diagram of an inner structure of a computer device according to an embodiment.

FIG. 2 is a schematic diagram of an internal structure of a computer device 200 according to an embodiment. The computer device 200 may be a transit server. The computer device 200 may be an information processing apparatus. As shown in FIG. 2, the computer device 200 includes a processor 201, a memory 202, and a network interface 203 that are connected by using a system bus 204. The memory 202 includes a non-volatile storage medium 211 and an internal memory 212. The non-volatile storage medium 211 of the computer device 200 may store an operating system 213 and computer-readable instructions 214. When the computer-readable instructions 214 are executed, the processor 201 may be caused to perform a data migration method. The processor 201 is configured to provide a computing capability and a control capability, to support operation of the entire transit server. The internal memory 212 may store computer-readable instructions 215. The computer-readable instructions 215, when executed by the processor, may cause the processor 201 to implement a data migration method. The network interface 203 is configured to perform network communication with an application terminal, a source database, and a target database, to receive information that is configured by a client terminal on the application terminal for data migration, and to connect to the source database and the target database according to the configuration information.

A person skilled in the art may understand that, in the structure shown in FIG. 2, a block diagram of a partial structure related to a solution in the disclosure is shown, and the structure shown in FIG. 2 does not constitute a limit to the terminal to which the solution in the disclosure is applied. Specifically, the server may include more components or fewer components than those shown in the figure, or some components may be combined, or a different component deployment may be used.

Figure 3:
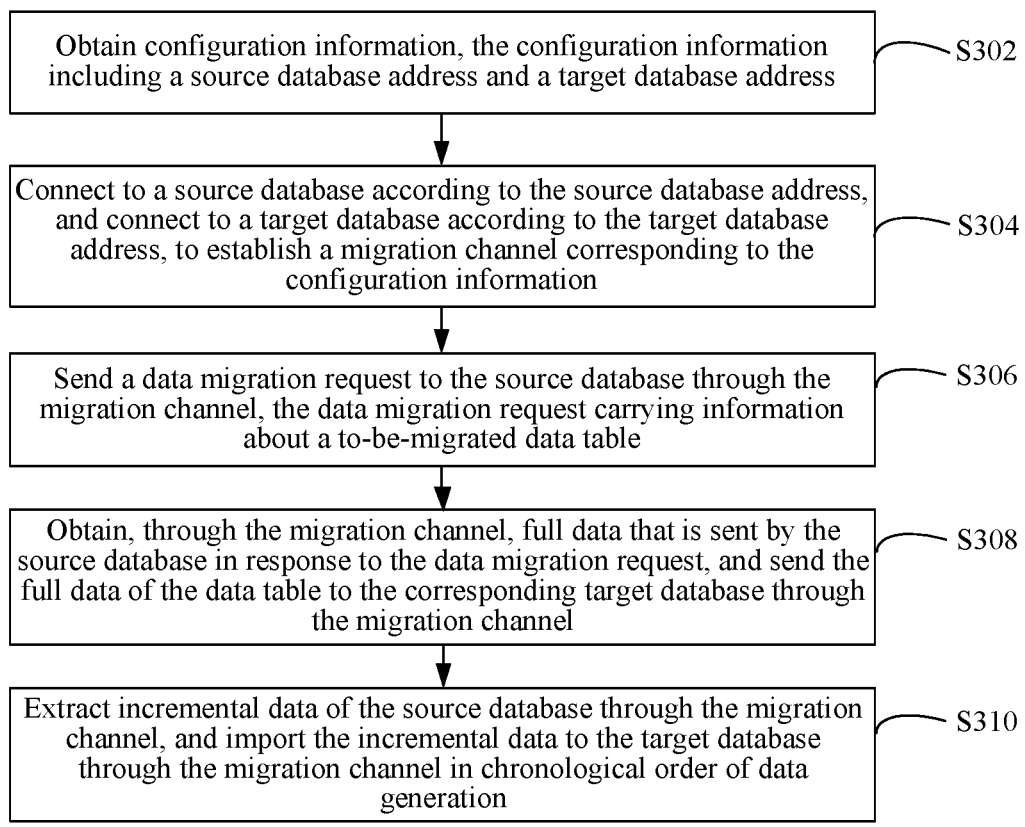
FIG. 3 is a flowchart of a data migration method according to an embodiment.

Referring to FIG. 3, in an embodiment, a data migration method is provided. The method is run on the transit server 102 shown in FIG. 1, and includes the following steps:

In step S302, obtain configuration information, for example of a source database and a target database. The configuration information can include a source database address (also referred to as a source address of the source database) and a target database address (also referred to as a target address of the target database).

The configuration information can be a configuration instruction that is entered by a user by using a client terminal of the application terminal 104 for data migration, and includes the source database address and the target database address. The source database address is an original storage address of data that needs to be migrated. The source database address may be a domain name, or may be an Internet Protocol (IP) address of a database, or may further be an IP address+a port number of a database.

The target database address is a target migration address of the data that needs to be migrated, and the target database address may be a domain name, or may be an IP address of a database, or may further be an IP address_+_a port number of a database. In the configuration information, a plurality of target database addresses may be configured for the current data migration, that is, the data of the source database may be migrated to a plurality of target databases at the same time.

The user enters the configuration information on the client terminal of the application terminal, and the application terminal sends the configuration information to the transit server. The client terminal in an embodiment is a client terminal of a data migration platform, and the client terminal may be a web page client terminal of the platform, or may be an application program terminal of the platform. The client terminal may receive the source database address and the target database address that are entered by the user, or may search, according to a user name of the user on the platform, the source database address and the target database address that are associated with the user, and separately displays the searched source database address and target database address on the client terminal, for the user to select.

In step S304, connect to a source database according to the source database address, and connect to a target database according to the target database address, to establish a migration channel corresponding to the configuration information. In an embodiment, the migration channel is between the source database and the target database.

After receiving the configuration information, the transit server separately connects to the source database and the target database according to the source database address and the target database address in the configuration information, and establishes a migration channel corresponding to the configuration information. It can be understood that, the transit server establishes the migration channel of the source database and the target database according to the source database address and the target database address in each piece of configuration information. There may be a plurality of pieces of configuration information in an embodiment, and the transit server can concurrently process a plurality of data migration channels at the same time. The transit server transmits (or sends) the data of the source database to the corresponding target database according to the migration channel.

In an embodiment, a data table in the source database can be migrated into an additional target database. In an example, the configuration information can further include an additional target address for the additional target database, and the migration channel is also configured to send the data table to the additional target database. For example, the data table can be sent through the migration channel to the target database and the additional target database in a parallel process. Alternatively, an additional piece of configuration information can be associated with the source database and the additional target database. The additional piece of configuration information can include the additional target address. An additional migration channel is configured to send the data table to the additional target database.

Specifically, the configuration information further includes a source database user name, a source database password, a target database user name, and a target database password. The source database user name, the source database password, the target database user name, and the target database password in an embodiment are used to verify whether the user has a reading/writing permission to a corresponding database.

In an embodiment, the step in which the transit server connects to a source database according to the source database address, and connects to a target database according to the target database address, to establish a migration channel corresponding to the configuration information includes the following step S304-1 and step S304-2:

In Step S304-1, send a connection request to the source database, the connection request including the source database address, a source database user name, and a source database password; and connect to the source database after being authenticated by the source database.

In an embodiment, the client terminal provides an interface for entering the source database user name and the source database password. After obtaining the source database address, the source database user name, and the source database password, the transit server sends the connection request to the source database. The source database verifies, according to the source database address, the source database user name, and the source database password, whether the user has a reading/writing permission to the source database, and if the user is determined to have the reading/writing permission to the source database, the source database connects to the transit server.

In Step S304-2, send a connection request to the target database, the connection request including the target database address, a target database user name, and a target database password; and connect to the target database after being authenticated by the target database, to establish the migration channel corresponding to the configuration information.

In an embodiment, the client terminal further provides an interface for entering the target database user name and the target database password. After obtaining the target database address, the target database user name, and the target database password, the transit server sends the connection request to the target database. The target database verifies, according to the target database address, the target database user name, and the target database password, whether the user has a permission for accessing the target database, and if the user has the permission for accessing the target database, the target database connects to the transit server.

After connecting to the source database and the target database, the transit server establishes a migration channel to source database and the target database.

In step S306, send a data migration request to the source database through the migration channel, the data migration request carrying information about a to-be-migrated data table (or a data table to be migrated from the source database to the target database).

After connecting to the source database, the transit server displays table information of the source database on a configuration page of the client terminal, the table information including names of data tables. The user may select all the data tables according to a need, to migrate all the data tables. The user may further select a specific to-be-migrated data table according to an application. In an embodiment, the data migration is performed by using a data table as a unit. The data table has a data structure (or a data table structure) that is extracted, for example, from data software, and includes information such as a field, an index, a key, and/or the like. In an example, a source database structure of the source database and a target database structure of the target database are similar or identical, and the data structure used in the source database and the target database is identical. In an example, a source database structure of the source database and a target database structure of the target database are different and the data structure used in the source database and the target database is identical, and thus, facilitating data migration between different types of data storage systems, such as between the source database and the target database having different database structures. In an example, multiple data tables can be migrated between the source database and the target database, and the multiple data tables use the same data structure.

The transit server sends a data migration request to the source database, the data migration request including a name that is of a to-be-migrated data table and that is selected by the user by using the configuration page of the client terminal. The source database migrates full data (or data) before a current time point according to the data table to the corresponding source database through the migration channel. The target database can be provided with a data structure (or a data table structure) that is the same as the data structure (or data table structure) of the to-be-migrated data table in the source database.

In step S308, obtain, through the migration channel, full data that is sent by the source database in response to the data migration request, and send the full data of the data table to the corresponding target database through the migration channel.

After receiving the data migration request, the source database sends the full data of the corresponding data table to the transit server in response to the data migration request. The full data of the source database may be sent to the transit server by using any suitable transmission protocol, for example, a hypertext protocol and a file transmission protocol.

After receiving the full data sent by the source database, the transit server sends the full data to the corresponding target database through the migration channel.

In step S310, send, from the source database to the target database, incremental data generated while sending the data in the data table from the source database to the target database. For example, in step S310, extract the incremental data of the source database through the migration channel, and import the incremental data to the target database through the migration channel in chronological order of data generation.

The incremental data is newly generated in a migration process of the full data, that is, refers to data change, including newly-adding, modification, and deletion. The transit server extracts the incremental data from the source database in a chronological order that the incremental data is generated through the data migration channel, stores the incremental data to a queue, and then extracts the incremental data from the queue and imports the incremental data to the corresponding target database, and completes the data migration according to the full data and the incremental data. Because the incremental data can be extracted, a service of the source database does not need to be interrupted during the data migration, thereby online or real-time data migration can be implemented between the source database and the target database. As described above, data migration can be implemented between different types of data storage systems, such as between the source database and the target database having different database structures, and thus, online or real time data migration can be implemented between different types of data storage systems, such as between the source database and the target database having different database structures.

In an embodiment, according to the migration request, the full data of the source database is migrated first, and then the incremental data is extracted in chronological order. Even though the new data is generated in the migration process of the full data, the full data can be migrated by extracting the incremental data, thereby maintaining data consistency between the source database and the target database. In addition, because the incremental data can be extracted, a service of the source database does not need to be interrupted, thereby implementing online data migration. Furthermore, the migration channel is correspondingly generated according to the source database address and the target database address of the configuration information, and a plurality of corresponding migration channels can be generated according to different configuration information at the same time, data migration of a plurality of databases is concurrently processed, so that operation convenience is high.

In another embodiment, the step of extracting incremental data of the source database through the migration channel includes the following step S310-1 and step S310-2:

In Step S310-1, configure an agent process for the source database, and read and parse a data log of the source database by using the agent process, to obtain incremental information of the source database. In an example, the incremental information indicates changes to the data while the data is sent from the source database to the target database.

In Step S310-2, extract, incremental data that corresponds to the incremental information from the source database through the migration channel in the chronological order of data generation.

In an embodiment, the agent process is configured in the source database, the data log is read by using the agent process, and the incremental information of the database is obtained by parsing a change of the data log. The agent process in an embodiment is a processing function of reading and parsing the data log of the database to obtain the incremental information. After the incremental information is obtained by using the agent process, the incremental data that corresponds to the incremental information is extracted, and the transit server configures the incremental data to the source database that needs to be migrated. The agent process extracts the incremental data of the source database in chronological order of data generation, and stores the incremental data to a queue. In an example, the transit server extracts the incremental data from the queue and then transmits the extracted incremental data to the corresponding target database.

Figure 4:
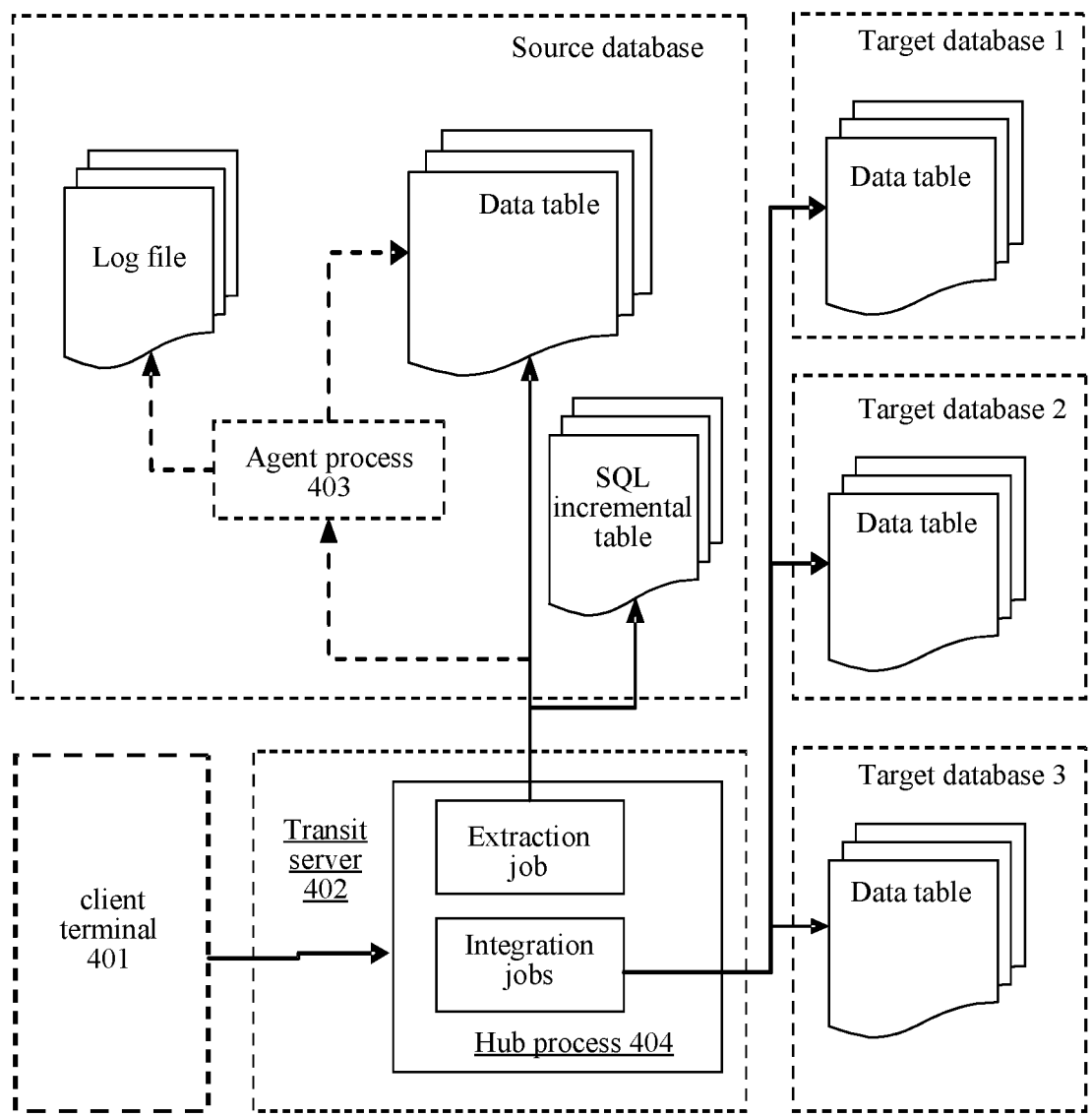
FIG. 4 is a schematic diagram of flow directions of data in a data migration method according to an embodiment.

As shown in FIG. 4, an embodiment provides two incremental data extraction manners. Specifically, the client terminal 401 further provides a configuration page for the user to select an incremental data extraction manner. When the user selects to extract the incremental data by analyzing the data log, the configuration page further prompts the user to enter a login name and a login password of a server on which the source database is located, to obtain a processing permission to the database. The configuration information in an embodiment further includes a login name and a login password of a server on which the source database is located (or a login name and a login password for the source database). An permission verification request is sent to the source database according to the login name and the login password of the server on which the source database is located, and an agent process 403 is configured for the source database after the source database permits.

After the processing permission to the data log of the source database is obtained, the agent process 403 is configured for the source database, the incremental information is obtained by reading and parsing the data log by using the agent process 403, and the incremental data is extracted from the data table according to the incremental information.

The configuration page of the client terminal 401 may further provide another incremental data obtaining manner for the user to select. For example, an embodiment may further provide a manner of providing the incremental data of the source database by creating a flip flop in the source database. Specifically, the step of connecting to a source database according to the source database address (or the source address) includes: connecting to the source database according to the source database address, and sending a flip flop generation instruction to the source database, so that the source database generates a flip flop according to the flip flop generation instruction.

In this case, the step of extracting incremental data of the source database through the migration channel includes: scanning an incremental table of the flip flop, and extracting the incremental data from the incremental table.

The flip flop may record adding, modification, and deletion operations that are performed on the data table. The flip flop records a change recording of the data table in a time period, such as while the full data is sent from the source database to the target database, and writes the recorded change recording into the incremental table. In an implementation, the flip flop writes the changed data into the incremental table, and extracts the incremental data from the incremental table. In an implementation, the incremental table stores an updated source table name, an updated key value, and an updated operation type, and incremental data is searched from the corresponding source table according to information in the incremental table and is extracted. A scanning frequency is set by a system, for example, the incremental table of the flip flop is scanned every three 3 seconds, and incremental information in this time period is obtained.

The configuration page of the client terminal 401 further provides another incremental data extracting manner for the user to select. For example, a timestamp manner is used. A timestamp field is added to a source table, and when the system updates and modifies data of the table, the system modifies a value of the timestamp at the same time. When the data is extracted, the incremental data is determined by comparing time of last extraction and the value of the timestamp field. For another example, a full-table comparison manner is used. A temporary table that has a structure similar to that of a to-be-migrated table of a database is established. The temporary table records a primary key of a source table and calculates the source table according to data of all fields. When scanning time approaches, the source table at a current moment is compared with a temporary table at last scanning time, to find out the incremental data.

In an embodiment, a hub process 404 can generate an extraction job and one or more integration jobs, such as integration jobs shown in FIG. 4. The extraction job can obtain incremental data from a SQL incremental table, the agent process 403, and/or the like. The extraction job can further store the incremental data into a queue. The integration jobs can extract the incremental data from the queue and import the incremental data to corresponding target databases 1-3 based on respective target addresses. The hub process 404 can be implemented in a transit server 402, such as a Linux server.

Figure 5:
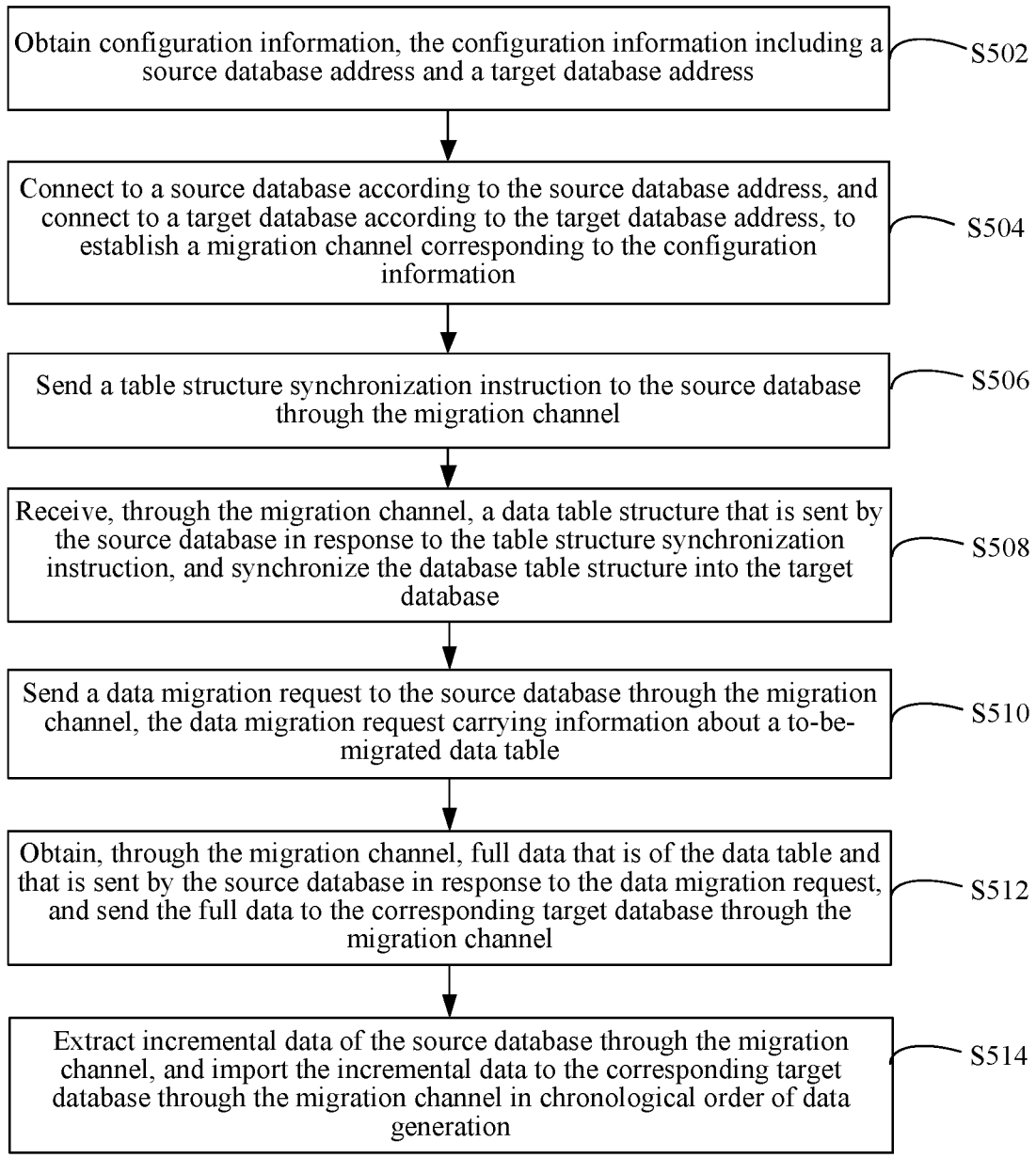
FIG. 5 is a flowchart of a data migration method according to an embodiment.

FIG. 5 is a flowchart of a data migration method according to an embodiment. As shown in FIG. 5, the method includes the following steps:

In step S502, obtain configuration information, the configuration information including a source database address and a target database address.

In step S504, connect to a source database according to the source database address, and connect to a target database according to the target database address, to establish a migration channel corresponding to the configuration information.

In step S506, send a table structure synchronization instruction to the source database through the migration channel.

In step S508, receive, through the migration channel, a data table structure that is sent by the source database in response to the table structure synchronization instruction, and synchronize the database table structure into the target database. In an example, the data table structure is sent to the target database to configure the target database to establish one or more data tables using the same data table structure.

The data table that corresponds to the source database may not be established in the target database, and a user may establish in advance in the target database the data table that corresponds to the source database, or the user may select an option of table structure synchronization on a configuration page. A transit server sends a table structure synchronization instruction to the source database through the migration channel, and receives the data table structure that is sent by the source database in response to the table structure synchronization instruction, and synchronizes the data table structure to the target database, so that the user does not need to manually establish the data table in advance in the target database.

In step S510, send a data migration request to the source database through the migration channel, the data migration request carrying information about a to-be-migrated data table.

In step S512, obtain, through the migration channel, full data that is of the data table and that is sent by the source database in response to the data migration request, and send the full data to the corresponding target database through the migration channel.

In step S514, extract incremental data of the source database through the migration channel, and import the incremental data to the corresponding target database through the migration channel in chronological order of data generation.

The foregoing data migration method may be applied between two or more databases, and the data of the source database is migrated to one or more target databases. The user may compare the source database with the target database, and after the user confirms that the data migration is completed, an application program is switched. The incremental data that is generated in a migration process of the full data is extracted through scheduled scanning. This does not affect data writing of the application program, and the service of the source database does not need to be interrupted, thereby implementing online data migration. Furthermore, in the data migration method, a data table is used as a migration unit, and the data log of the source database is analyzed by configuring the agent process or the flip flop is established on the source database, to obtain the incremental data, so that online data migration between a plurality of heterogeneous data storage systems (including a relational database, a file system, a distributed file system, a message queue, and the like) can be extensively supported.

Figure 6:
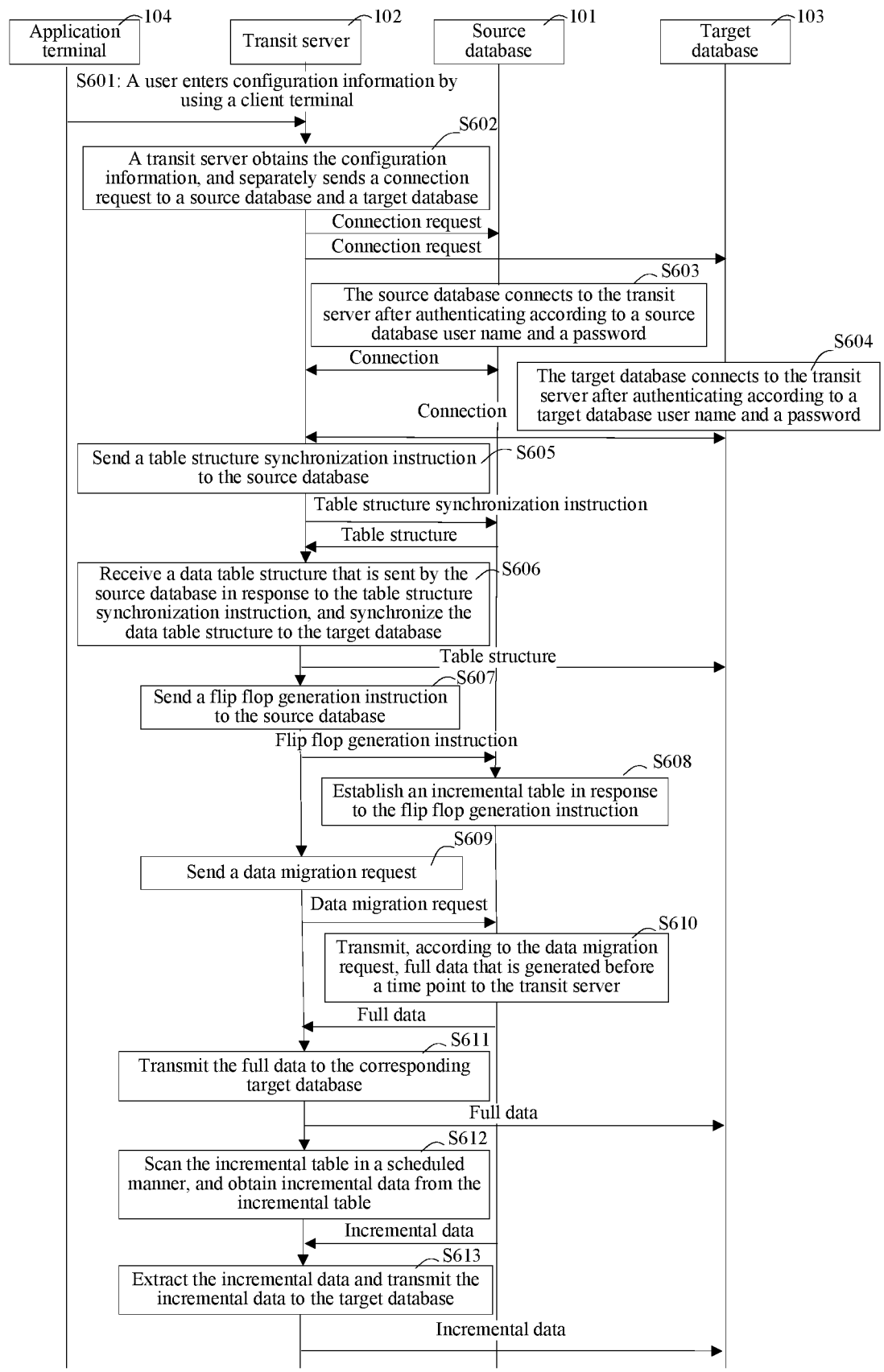
FIG. 6 is a diagram illustrating a time sequence of a data migration method according to an embodiment.

In an example of an application scenario, the foregoing data migration method is applied to a scenario in which data of a source database is migrated to a network cloud server. As shown in FIG. 6, the example includes the following steps.

In step S601, an application terminal obtains configuration information that is entered by a user by using a client terminal, the configuration information including a source database address, a source database user name, a source database password, a target database address, a target database user name, and a target database password. The configuration information further includes a manner that is selected by the user to obtain incremental data. If the user selects to obtain the incremental data by using a data log, the configuration information further includes a database login name and a login password.

The client terminal in an embodiment is a client terminal of a network cloud platform, and a transit server is a part of the network cloud platform, thereby providing support for data migration.

In step S602, a transit server obtains the configuration information, and separately sends a connection request to a source database and a target database.

In step S603, the source database connects to the transit server after authenticating according to the source database user name and the source database password.

In step S604, the target database connects to the transit server after authenticating according to the target database user name and the target database password.

After respectively connecting to the source database and the target database, the transit server establishes a migration channel corresponding to the configuration information. Data is obtained from the source database through the migration channel, and the obtained data is migrated to the target database corresponding to the source database.

In step S605, the transit server sends a table structure synchronization instruction to the source database.

In step S606, the transit server receives a data table structure that is sent by the source database in response to the table structure synchronization instruction, and synchronizes the data table structure to the target database.

After the source database connects to the transit server, according to the manner that is selected by the user for obtaining the incremental data, the transit server configures an agent process for the source database, or the transit server sends a flip flop generation instruction to the source database. In an embodiment, description is made by using an example in which the manner is a flip flop.

In step S607, the transit server sends a flip flop generation instruction to the source database.

In step S608, the source database establishes an incremental table in response to the flip flop generation instruction.

The incremental table is used to record the incremental data that is generated in a migration process of full data.

In step S609, the transit server sends a data migration request to the source database, the data migration request including information about a to-be-migrated data table.

After the transit server connects to the source database, the client terminal displays the data table of the source database for the user to select. The user selects information about a to-be-migrated data table according to a need and sends a data migration request to the source database. The migration request further includes the information about the to-be-migrated data table.

In step S610, the source database transmits full data to the transit server according to the data migration request.

In step S611, the transit server transmits the full data to the corresponding target database.

In step S612, the transit server scans the incremental table in a scheduled manner, obtains the incremental data from the incremental table, and stores the incremental data to a queue.

In step S613, the transit server extracts the incremental data from the queue to the target database.

The data migration is completed by using the full data and the incremental data.

In an embodiment, a computer device is further provided. An internal structure of the computer device is shown in FIG. 2. The computer device includes a data migration apparatus, the data migration apparatus includes modules, and each module may be all or partially implemented by software, hardware, or a combination thereof.

Figure 7:
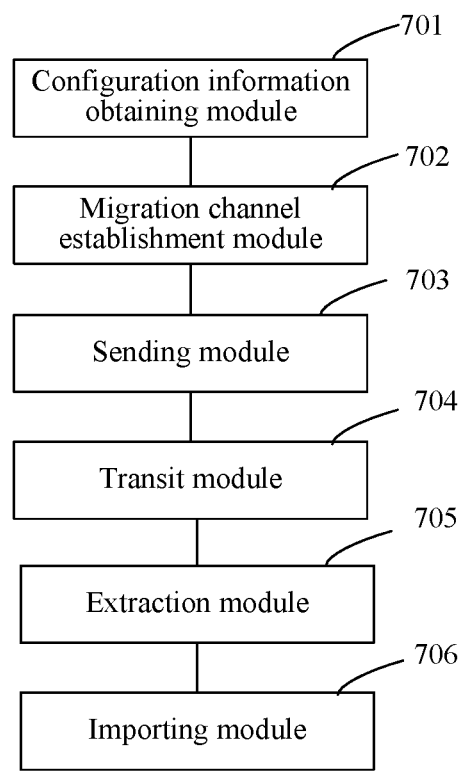
FIG. 7 is a structural block diagram of a computer device according to an embodiment.

In an embodiment, a data migration apparatus is provided. As shown in FIG. 7, the data migration apparatus includes: a configuration information obtaining module 701, a migration channel establishment module 702, a sending module 703, a transit module 704, an extraction module 705, and an importing module 706.

The configuration information obtaining module 701 is configured to obtain configuration information, the configuration information including a source database address and a target database address.

The migration channel establishment module 702 is configured to: connect to a source database according to the source database address; and connect to a target database according to the target database address, to establish a migration channel corresponding to the configuration information.

The sending module 703 is configured to send a data migration request to the source database through the migration channel, the data migration request carrying information about a to-be-migrated data table.

The transit module 704 is configured to: obtain, through the migration channel, full data that is of the data table and that is sent by the source database in response to the data migration request; and send the full data to the corresponding target database through the migration channel.

The extraction module 705 is configured to extract incremental data of the source database through the migration channel. The importing module 706 is configured to import the incremental data to the corresponding target database through the migration channel in chronological order of data generation.

The foregoing data migration apparatus first migrates the full data of the source database according to the migration request, and then extracts the incremental data in chronological order. Even though new data is generated in the migration process of the full data, the full data can be migrated by extracting the incremental data, thereby maintaining data consistency between the source database and the target database. In addition, because the incremental data can be extracted, a service of the source database does not need to be interrupted, thereby implementing online data migration. Furthermore, the migration channel is correspondingly generated according to the source database address and the target database address of the configuration information, and a plurality of corresponding migration channels can be generated according to different configuration information at the same time, data migration of a plurality of databases is concurrently processed, so that operation convenience is high.

Figure 8:
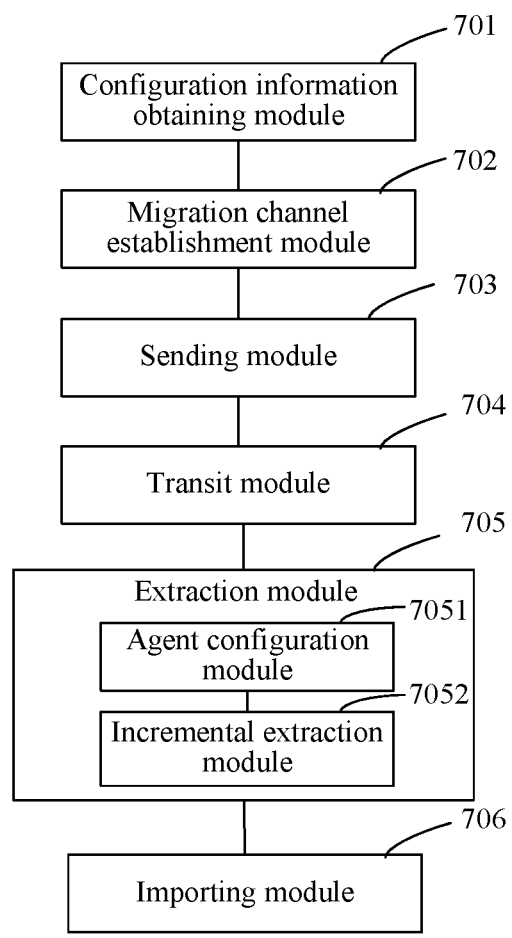
FIG. 8 is a structural block diagram of a computer device according to an embodiment.

In another embodiment, as shown in FIG. 8, the extraction module 705 includes an agent configuration module 7051 and an incremental extraction module 7052.

The agent configuration module 7051 is configured to: configure an agent process for the source database; and read and parse a data log of the source database by using the agent process, to obtain incremental information of the source database.

The incremental extraction module 7052 is configured to extract, incremental data that corresponds to the incremental information from the source database through the migration channel in chronological order of data generation.

In still another embodiment, the sending module 703 is further configured to: send a flip flop generation instruction to the source database after connecting to the source database, so that the source database generates a flip flop according to the flip flop generation instruction. The extraction module 705 is configured to: scan an incremental table of the flip flop; and extract the incremental data from the incremental table.

In yet another embodiment, the configuration information includes a source database user name, a source database password, a target database user name, and a target database password. The migration channel establishment module 702 is configured to: send a connection request to the source database, the connection request including the source database address, a source database user name, and a source database password; and connect to the source database after being authenticated by the source database. The migration channel establishment module 702 is further configured to: send a connection request to the target database, the connection request including the target database address, a target database user name, and a target database password; and connect to the target database after being authenticated by the target database, to establish the migration channel corresponding to the configuration information.

In another embodiment, the configuration information further includes a login name and a login password of a server on which the source database is located. The sending module 703 is further configured to send an permission verification request to the source database according to the login name and the login password of the server on which the source database is located. The agent configuration module 7051 is configured to configure an agent process for the source database after being authenticated by the source database.

In still another embodiment, the sending module 703 is further configured to send a table structure synchronization instruction to the source database through the migration channel. The transit module 704 is further configured to: receive, through the migration channel, a data table structure that is sent by the source database in response to the table structure synchronization instruction; and synchronize the database table structure to target database.

The foregoing data migration apparatus may be applied between two or more databases, and the data of the source database is migrated to one or more target databases. The user may compare the source database with the target database, and after the user confirms that the data migration is completed, an application program is switched. The incremental data that is generated in a migration process of the full data is extracted through scheduled scanning. This does not affect data writing of the application program, and the service of the source database does not need to be interrupted, thereby implementing online data migration. Furthermore, according to the data migration apparatus, a data table is used as a migration unit, and the data log of the source database is analyzed by configuring the agent process or the flip flop is established on the source database, to obtain the incremental data, so that online data migration between a plurality of heterogeneous data storage systems (including a relational database, a file system, a distributed file system, a message queue, and the like) can be extensively supported.

The steps in the embodiments of the disclosure are not necessarily sequentially performed in an order indicated by step numbers. Unless otherwise clearly described in this specification, an order of performing the steps is not strictly limited, and the steps may be performed in another order. In addition, at least some steps in the embodiments may include a plurality of sub-steps or a plurality of stages. The sub-steps or stages are not necessarily performed at the same moment, and instead may be performed at different moments. The sub-steps or stages are not necessarily sequentially performed, and instead the sub-steps or stages and at least some of other steps or sub-steps or stages of other steps may be performed by turns or alternately.

A person of ordinary skill in the art may understand that all or some of the processes of the methods in the foregoing embodiments may be implemented by a computer program instructing relevant hardware. The program may be stored in a non-transitory computer-readable storage medium such as a non-volatile computer-readable storage medium. When the program is run, the processes of the foregoing methods in the embodiments are performed. Any reference to a memory, storage, database or another medium used in the various embodiments provided in the disclosure may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external high-speed cache. By way of illustration and not limitation, the RAM is available in a variety of forms, such as a static RAM (SRAM), a dynamic RAM (DRAM), a synchronous RAM (SDRAM), a dual data rate SDRAM (DDRSDRAM), an enhanced SDRAM (ESDRAM), a synchronization link (Synchlink) DRAM (SLDRAM), a memory Bus (Rambus) direct RAM (RDRAM), a direct memory bus dynamic RAM (DRDRAM), and a memory bus dynamic RAM (RDRAM). Technical features in the foregoing embodiments may be combined randomly. For the brevity of description, not all possible combinations of various technical features in the foregoing embodiments are described. However, as long as combinations of these technical features do not contradict each other, it should be considered that the combinations all fall within the scope of this specification.

The foregoing embodiments describe several implementations of the disclosure, which are described specifically and in detail, and therefore should not be construed as a limitation to the patent scope of the present disclosure. It should be noted that various changes and improvements may further be made by a person of ordinary skill in the art without departing from the idea of the disclosure, and these changes and improvements all fall within the protection scope of the disclosure. Therefore, the protection scope of the disclosure shall be subject to the appended claims.

What is claimed is:

1. A data migration method, comprising:
obtaining, by processing circuitry of a transit server, configuration information of a source database in a first server and a target database in a second server, the configuration information including a source address of the source database and a target address of the target database;
establishing, by the processing circuitry, a migration channel between the source database and the target database based on the configuration information by connecting the transit server to the source database in the first server according to the source address, and connecting the transit server to the target database in the second server according to the target address;
sending, by the processing circuitry, a data migration request to the source database through the migration channel, the data migration request including information of one or more data tables including data to be migrated from the source database to the target database, the one or more data tables having a data table structure;

sending, by the processing circuitry through the migration channel, the data in the one or more data tables from the source database in the first server to the target database in the second server; and sending, from the source database in the first server to the target database in the second server, incremental data, the incremental data being generated while the data in the one or more data tables is sent from the source database in the first server to the target database in the second server.

2. The method according to claim 1, wherein the sending the incremental data further comprises:

extracting, through the migration channel, the incremental data of the source database in the first server; and importing the incremental data to the target database in the second server through the migration channel in a chronological order that the incremental data is generated.

3. The method according to claim 2, wherein the extracting the incremental data further comprises:

configuring an agent process for the source database in the first server;

parsing, by the agent process, a data log of the source database to obtain incremental information of the source database, the incremental information indicating changes to the data while the data is sent from the source database in the first server to the target database in the second server; and extracting the incremental data that corresponds to the incremental information in the chronological order.

4. The method according to claim 2, wherein the extracting the incremental data further comprises:

sending a flip-flop generation instruction to the source database in the first server that is configured to generate a flip-flop according to the flip flop generation instruction, the flip-flop indicating changes to the data in an incremental table, the changes being made while the data is sent from the source database in the first server to the target database in the second server; and extracting, by the processing circuitry, the incremental data from the incremental table.

5. The method according to claim 1, wherein the configuration information further includes a source database user name, a source database password, a target database user name, and a target database password;

the establishing the migration channel includes:

sending, by the processing circuitry, a source connection request to the source database in the first server, the source connection request including the source address, the source database user name, and the source database password; and connecting the transit server to the source database in the first server after being authenticated by the source database;

sending, by the processing circuitry, a target connection request to the target database in the second server, the target connection request including the target address, the target database user name, and the target database password; and connecting the transit server to the target database in the second server after being authenticated by the target database.

6. The method according to claim 3, wherein the configuration information further includes a login name and a login password for the source database; and the configuring the agent process further includes:

sending a permission verification request to the source database according to the login name and the login password; and configuring the agent process for the source database after being authenticated by the source database.

7. The method according to claim 1, further comprising:

sending, by the processing circuitry through the migration channel, a synchronization instruction to the source database in the first server;

receiving, from the source database, the data table structure in response to the synchronization instruction; and sending the data table structure to the target database in the second server to configure the target database to establish a data table using the same data table structure.

8. The method according to claim 1, wherein a source database structure of the source database in the first server is different from a target database structure of the target database in the second server.

9. The method according to claim 1, wherein the configuration information further includes an additional target address of an additional target database; and the method further includes:

sending the data in the one or more data tables from the source database to the additional target database; and sending, from the source database to the additional target database, the incremental data.

10. A transit server, comprising:

processing circuitry configured to:

obtain configuration information of a source database in a first server and a target database in a second server, the configuration information including a source address of the source database and a target address of the target database;

establish a migration channel between the source database and the target database based on the configuration information by connecting the transit server to the source database in the first server according to the source address, and connecting the transit server to the target database in the second server according to the target address;

send a data migration request to the source database through the migration channel, the data migration request including information of one or more data tables including data to be migrated from the source database to the target database, the one or more data tables having a data table structure;

send, through the migration channel, the data in the one or more data tables from the source database in the first server to the target database in the second server; and send, from the source database in the first server to the target database in the second server, incremental data, the incremental data being generated while the data in the one or more data tables is sent from the source database in the first server to the target database in the second server.

11. The transit server according to claim 10, wherein the processing circuitry is configured to:

extract, through the migration channel, the incremental data of the source database in the first server; and import the incremental data to the target database in the second server through the migration channel in a chronological order that the incremental data is generated.

12. The transit server according to claim 11, wherein the processing circuitry is configured to:
configure an agent process for the source database in the first server, the agent process being configured to parse a data log of the source database to obtain incremental information of the source database, the incremental information indicating changes to the data while the data is sent from the source database in the first server to the target database in the second server; and
extract the incremental data that corresponds to the incremental information in the chronological order.

13. The transit server according to claim 11, wherein the processing circuitry is configured to:
send a flip-flop generation instruction to the source database in the first server that is configured to generate a flip-flop according to the flip flop generation instruction, the flip-flop indicating changes to the data in an incremental table, the changes being made while the data is sent from the source database in the first server to the target database in the second server; and
extract the incremental data from the incremental table.

14. The transit server according to claim 10, wherein
the configuration information further includes a source database user name, a source database password, a target database user name, and a target database password; and
the processing circuitry is configured to:
send a source connection request to the source database in the first server, the source connection request including the source address, the source database user name, and the source database password;
connect the transit server to the source database in the first server after being authenticated by the source database;
send a target connection request to the target database in the second server, the target connection request including the target address, the target database user name, and the target database password; and
connect the transit server to the target database in the second server after being authenticated by the target database.

15. The transit server according to claim 12, wherein
the configuration information further includes a login name and a login password for the source database; and
the processing circuitry is configured to:
send a permission verification request to the source database according to the login name and the login password; and
configure the agent process for the source database after being authenticated by the source database.

16. The transit server according to claim 10, wherein the processing circuitry is configured to:
send, through the migration channel, a synchronization instruction to the source database in the first server;
receive, from the source database, the data table structure in response to the synchronization instruction; and
send the data table structure to the target database in the second server to configure the target database to establish a data table using the same data table structure.

17. The transit server according to claim 10, wherein a source database structure of the source database in the first server is different from a target database structure of the target database in the second server.

18. A non-transitory computer-readable medium storing computer-readable instructions, which when executed by one or more processors cause the one or more processors to perform a method of a transit server, the method comprising:
obtaining configuration information of a source database in a first server and a target database in a second server, the configuration information including a source address of the source database and a target address of the target database;
establishing a migration channel between the source database and the target database based on the configuration information by
connecting the transit server to the source database in the first server according to the source address, and
connecting the transit server to the target database in the second server according to the target address;
sending a data migration request to the source database through the migration channel, the data migration request including information of one or more data tables including data to be migrated from the source database to the target database, the one or more data tables having a data table structure;
sending, through the migration channel, the data in the one or more data tables from the source database in the first server to the target database in the second server; and
sending, from the source database in the first server to the target database in the second server, incremental data, the incremental data being generated while the data in the one or more data tables is sent from the source database in the first server to the target database in the second server.

* * * * *